United States Patent
Hsu et al.

(10) Patent No.: US 7,612,631 B2
(45) Date of Patent: Nov. 3, 2009

(54) MOTHERBOARD

(75) Inventors: Shou-Kuo Hsu, Taipei Hsien (TW);
Chien-Hung Liu, Taipei Hsien (TW);
Cheng-Shien Li, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 169 days.

(21) Appl. No.: 11/942,727

(22) Filed: Nov. 20, 2007

(65) Prior Publication Data
US 2009/0096555 A1  Apr. 16, 2009

(30) Foreign Application Priority Data
Oct. 11, 2007  (CN) .......................... 2007 1 0202004

(51) Int. Cl.
*H03H 2/00* (2006.01)
*H01P 1/10* (2006.01)
(52) U.S. Cl. ..................... 333/24 R; 333/260; 326/30
(58) Field of Classification Search ............... 333/24 R, 333/172, 260; 326/30, 86; 455/575.1
See application file for complete search history.

(56) References Cited

U.S. PATENT DOCUMENTS 5,374,861 A 12/1994 Kubista 6,825,693 B2 * 11/2004 Schoenborn et al. .......... 326/86
2004/0067782 A1 * 4/2004 Kagan et al. ............. 455/575.1

FOREIGN PATENT DOCUMENTS

EP 1783596 A2 5/2007

* cited by examiner

*Primary Examiner*—Dean O Takaoka
(74) *Attorney, Agent, or Firm*—Frank R. Niranjan

(57) ABSTRACT

A motherboard includes a signal control chip, a signal switch chip connected to the signal control chip via a plurality of first transmission lines, and a complex connector configured for connecting to a first type of transmission device or a second type of transmission device. The signal control chip is connected to the complex connector via the first transmission lines and a plurality of second transmission lines. The signal switch chip is electrically connected to the complex connector via a plurality of third transmission lines. Each second transmission line is connected in series with a first resistor. Each third transmission line is connected in series with a second resistor. When the first type of transmission device is mounted on the complex connector, the signal switch chip and the second resistors are removed. When the second type of transmission device is mounted on the complex connector, the first resistors are removed.

11 Claims, 1 Drawing Sheet

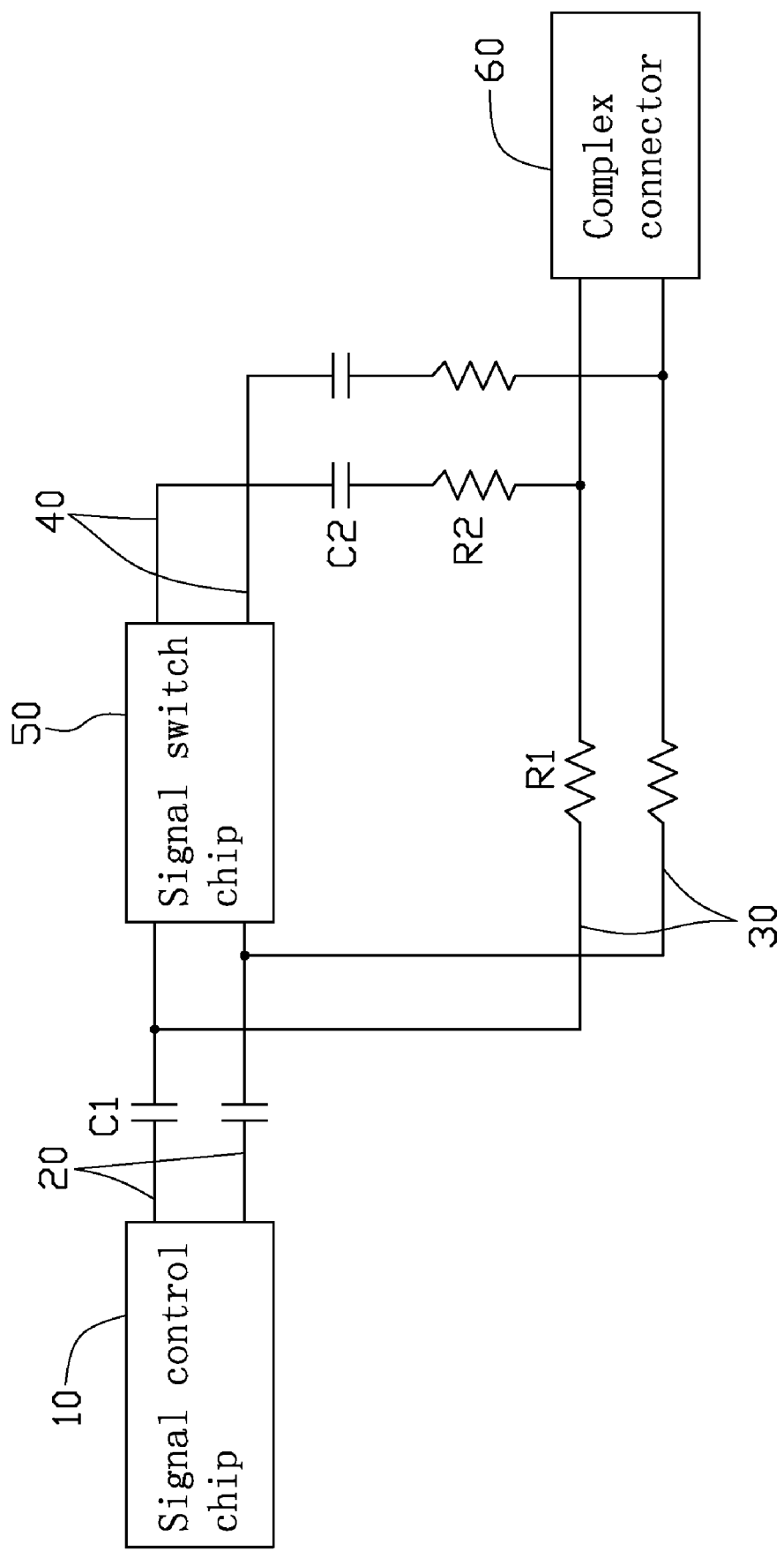

MOTHERBOARD

BACKGROUND

1. Field of the Invention

The present invention relates to motherboards, and particularly to a motherboard that flexibly supports two different transmitting devices via a complex connector thereof.

2. Description of Related Art

A typical personal computer comprises a motherboard, memory modules, and peripheral accessories, and the motherboard is the heart of the personal computer. On the motherboard, in addition to the central processing unit (CPU), the chip set, and the slots for installing the memory modules, it further includes hard disk drive (HDD) connectors to install HDDs such as SAS (serial attached SCSI) HDD and SATA (serial ATA) HDD. Moreover, the SAS HDD and SATA HDD can use a same complex connector for transmitting data signals. But one motherboard only can support SAS HDDs or SATA HDDs at one time. It is a disadvantage that the motherboard can support only SAS HDDs or SATA HDDs at one time because layout of the motherboard must be changed accordingly, thus the cost for producing motherboards is high.

What is needed is to provide a motherboard capable of flexibly supporting different types of transmission devices which can use a same complex connector.

SUMMARY

An embodiment of a motherboard includes a signal control chip, a signal switch chip connected to the signal control chip via a plurality of first transmission lines, and a complex connector configured for connecting to a first type of transmission device or a second type of transmission device. The signal control chip is connected to the complex connector via the first transmission lines and a plurality of second transmission lines. The signal switch chip is electrically connected to the complex connector via a plurality of third transmission lines. Each second transmission line is connected in series with a first resistor. Each third transmission line is connected in series with a second resistor. When the first type of transmission device is mounted on the complex connector, the signal switch chip and the second resistors are removed. When the second type of transmission device is mounted on the complex connector, the first resistors are removed instead.

Other advantages and novel features of the present invention will become more apparent from the following detailed description of an embodiment when taken in conjunction with the accompanying drawing, in which:

BRIEF DESCRIPTION OF THE DRAWING

The drawing is a circuit diagram of a motherboard in accordance with an embodiment of the present invention.

DETAILED DESCRIPTION

Referring to the drawing, a motherboard in accordance with an embodiment of the present invention includes a signal control chip 10, a plurality of first transmission lines 20, a plurality of second transmission lines 30, a plurality of third transmission lines 40, a signal switch chip 50, and a complex connector 60. The complex connector 60 is configured for connecting to a first type of transmission device or a second type of transmission device. In this embodiment, the first transmission device is a SAS HDD, the second transmission device is a SATA HDD (namely the complex connector 60 is a SAS/SATA complex connector). The signal switch chip 50 is a SAS-SATA signal switch chip. The signal control chip 10 is a high speed differential signal control chip such as a north bridge chip. For easily illustrating the present invention, the transmission lines are each represented by only two lines in the drawing.

The signal control chip 10 is electrically connected to the complex connector 60 via the first transmission lines 20 and the second transmission lines 30. Each of the first transmission lines 20 is connected in series with a first capacitor C1. Each of the second transmission lines 30 is connected in series with a first zero Ohm resistor R1. The signal control chip 10 is electrically connected to the signal switch chip 50 via the first transmission lines 20. The signal switch chip 50 is electrically connected to the complex connector 60 via the third transmission lines 40. Each of the third transmission lines 40 is connected in series with a second capacitor C2 and a second zero Ohm resistor R2. The signal control chip 10, the signal switch chip 50, the complex connector 60, the resistors R1 and R2, and the capacitors C1 and C2 are mounted on the motherboard via corresponding pads on the motherboard.

When the first type of transmission device is mounted on the complex connector 60, the signal switch chip 50, the second zero Ohm resistors R2, and the second capacitors C2 are removed from the motherboard thereby disconnecting the third transmission lines 40 from the complex connector 60. The signal control chip 10 can directly communicate with the first type of transmission device. The removal of the second zero Ohm resistors R2 leaves stubs between the complex connector 60 and the second zero Ohm resistors R2. In order to avoid signal reflection because of impedance mismatching, the lengths of the stubs of the third transmission lines 40 must satisfy the following formula:

$$L\text{stub} < (Tj*V)/2;$$

$$V = C/\sqrt{\in_e}$$

Wherein Lstub denotes the lengths of the stubs of the third transmission lines 40, Tj denotes a jitter tolerance of a signal in the transmission line, V denotes the speed of the signal, C denotes a velocity of light, and $\in_e$ denotes a dielectric constant of the transmission line.

When the second type of transmission device is mounted on the complex connector 60, the first zero Ohm resistors R1 are removed from the motherboard instead, thereby disconnecting the second transmission lines 30 from the complex connector 60. The signal control chip 10 can communicate with the second type of transmission device via the signal switch chip 50. The removal of the first zero Ohm resistors R1 leaves stubs between the complex connector 60 and the first zero Ohm resistors R2. In order to avoid signal reflection because of impedance mismatching, the lengths of the stubs of the second transmission lines 30 must satisfy the following formula:

$$L\text{stub} < (Tj*V)/2;$$

$$V = C/\sqrt{\in_e}$$

Wherein Lstub denotes the lengths of the stubs of the second transmission lines 30, Tj denotes a jitter tolerance of a signal in the transmission lines, V denotes the speed of the signal, C denotes a velocity of light, and $\in_e$ denotes a dielectric constant of the transmission line.

In this embodiment, the first capacitors C1 and the second capacitors C2 are configured to filter the direct current part of the differential signals in the transmission lines. If there is no direct current part of the differential signals or the part is very small, the first capacitors C1 and the second capacitors C2 can be omitted for reducing costs.

Thus, the motherboard is capable of flexibly supporting different types of transmission devices that can use a same complex connector, and signal integrity is maintained, and the cost for designing and producing motherboards is reduced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A motherboard, comprising:
    a signal control chip;
    a signal switch chip electrically connected to the signal control chip via a plurality of first transmission lines; and
    a complex connector configured for connecting to a first type of transmission device or a second type of transmission device, the signal control chip electrically connected to the complex connector via the plurality of first transmission lines and a plurality of second transmission lines, the signal switch chip electrically connected to the complex connector via a plurality of third transmission lines, each of the second transmission lines connected in series with a first resistor, each of the third transmission lines connected in series with a second resistor;
    wherein when the first type of transmission device is mounted on the complex connector, the signal switch chip and the second resistors are removed from the motherboard, when the second type of transmission device is mounted on the complex connector, the first resistors are removed from the motherboard instead.

2. The motherboard as claimed in claim 1, wherein when the first or second resistors are removed from the motherboard remaining stubs of the transmission lines must satisfy the following formula: Lstub<(Tj*V)/2, Tj denotes a jitter tolerance of a signal in the transmission line, V denotes the speed of the signal.

3. The motherboard as claimed in claim 1, wherein the first and second resistors are zero Ohm resistors.

4. The motherboard as claimed in claim 1, wherein each of the first transmission lines is connected in series with a first capacitor.

5. The motherboard as claimed in claim 1, wherein each of the third transmission lines is connected in series with a second capacitor.

6. The motherboard as claimed in claim 1, wherein the first transmission device is a SAS HDD, the second transmission device is a SATA HDD, the complex connector is a SAS/SATA complex connector, the signal switch chip is a SAS-SATA signal switch chip.

7. A motherboard, comprising:
    a signal control chip pad configured for mounting a signal control chip;
    a signal switch chip pad configured for mounting a signal switch chip and electrically connected to the signal control chip pad via a plurality of first transmission lines; and
    a complex connector pad configured for mounting a complex connector which can connect with a first type of transmission device or a second type of transmission device, the signal control chip pad electrically connected to the complex connector via the plurality of first transmission lines and a plurality of second transmission lines, the signal switch chip pad electrically connected to the complex connector pad via a plurality of third transmission lines, each of the second transmission lines connected in series with a first resistor pad configured for mounting a first resistor, each of the third transmission lines connected in series with a second resistor pad configured for mounting a second resistor.

8. The motherboard as claimed in claim 7, wherein the length between the first resistor pads and the complex connector pads must satisfy the following formula:
    Lstub<(Tj*V)/2, Lstub denotes the length between the first resistor pads and the complex connector pads, Tj denotes a jitter tolerance of a signal in the transmission line, V denotes the speed of the signal.

9. The motherboard as claimed in claim 7, wherein the length between the second resistor pads and the complex connector pads must satisfy the following formula:
    Lstub<(Tj*V)/2, Lstub denotes the length between the second resistor pads and the complex connector pads, Tj denotes a jitter tolerance of a signal in the transmission line, V denotes the speed of the signal.

10. The motherboard as claimed in claim 7, wherein each of the first transmission lines is connected in series with a first capacitor pad configured for mounting a first capacitor.

11. The motherboard as claimed in claim 7, wherein each of the third transmission lines is connected in series with a second capacitor pad configured for mounting a second capacitor.

* * * * *